Figure 1:
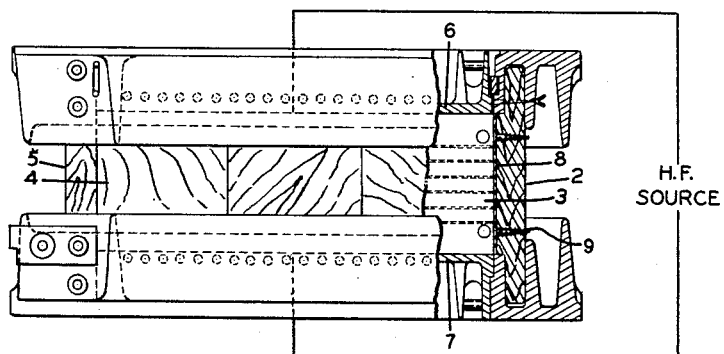

May 10, 1955

G. E. GARD 2,707,802

MOLD WITH A VENTED LINER

Filed Jan. 25, 1954

INVENTOR
GEORGE E. GARD

ATTORNEY

United States Patent Office 2,707,802
Patented May 10, 1955

2,707,802

MOLD WITH A VENTED LINER

George E. Gard, East Hempfield Township, Lancaster County, Pa., assignor to Armstrong Cork Company, Lancaster, Pa., a corporation of Pennsylvania Application January 25, 1954, Serial No. 405,784

4 Claims. (Cl. 18—34)

This invention relates to a mold for confining a charge of dielectric material during processing by dielectric heating, in which the charge of material and the mold are both dielectrically heated simultaneously. It is concerned more particularly with a lined mold such as disclosed in my copending application Serial No. 338,107, filed February 20, 1953, of which the present application is a continuation in part.

In my prior application there is disclosed and claimed a mold including a backing of dielectric material such as a piece of hard wood $2\frac{1}{8}''$ thick impregnated with ceresin wax and a liner of dielectric material such as a $\frac{1}{8}''$ thick sheet of continuous filament glass fabric impregnated and bonded with a silicone resin. The liner has a dielectric loss factor lower than the dielectric loss factor of the hard wood backing, good resistance to absorption of moisture, a smooth surface, good resistance to deterioration under repeated cycles of heating and cooling, mechanical strength adequate to withstand the pressures encountered in molding without excessive deformation or flow, and good resistance to arcing.

As mentioned in my prior application, difficulties are encountered when a mold which has been used for making a cork tile composition, for instance, where the binder consists essentially of a phenol-aldehyde resin, is charged with a lower density cork gasket composition, for example, where the binder consists essentially of glue, glycerine, and formaldehyde. The outer surface of the charge of cork, glue, glycerine, and formaldehyde will be charred and the product will be undercured internally on the first cycle following a run of the cork tile composition. The mold of my prior application has solved that problem.

In the manufacture of cork compositions, the natural bark of the cork oak tree is ground and graded as to size and quality. Granules of the desired particle size and quality are obtained by the use of wire mesh sieves which separate the particles within a desired size range and gravity separators which remove particles of undesired quality. The graded granules are then bagged for subsequent use. The moisture content of the granules varies from time to time, depending upon the original moisture content of the cork bark, the conditions of storage, general atmospheric conditions during the storage interval, and other factors. It has been found that where the moisture content of the cork is high, in the order of 10–15% by weight, there is a tendency for the glass fabric liner to be delaminated in certain areas thereof upon the initial cycle of a run of cork, glue, and glycerine gasket composition following a cycle of manufacture of mats of cork tile composition. Notwithstanding the fact that the liner material is unusually resistant to moisture absorption, it is minutely pervious to the passage of moisture, and during the repeated manufacture of cork tile mats in the mold, some moisture migrates into the body of the liner under the heat and pressure conditions encountered in the dielectric heating of the mass in the mold. This minor amount causes no serious consequences so long as cork tile composition is being produced, for it is believed to be generally in equilibrium with the average moisture content of the cork composition charge within the mold, and the heating rate within the liner is not so essentially different from that within the mass as to cause trouble. However, when a lower density cork, glue, and glycerine composition for gaskets is to be made in the same mold, on the first cycle, before equilibrium is possible between mold liner and cork composition charge, it is believed that the moisture within the liner, even though it be relatively infinitesimal, causes the mold liner to heat at an excessive rate, resulting in the formation of steam and the building up of pressure within the liner adequate to actually cause delamination and blisters. This condition is aggravated by the fact that in the production of gasket compositions, the compression applied to the cork granules is not nearly as great as in the manufacture of cork tile mats where a product of much greater density is formed. As a result, the lateral thrust of the lower density mass of cork composition against the liner is small. As a matter of fact, the lateral pressure may be in the order of only five pounds per square inch, due to the fact that cork is essentially truly compressible, i. e., when pressure is applied between the upper and lower platen electrodes within the mold, the major component of force is in the direction of applied pressure, with only an insignificant component normal thereto. Regardless of theory, actual instances of mold liner delamination have been observed with the laminated glass filament fabric impregnated with silicone resin material disclosed in my prior application, even though this material shows a moisture absorption of but .35% when 1" x 3" specimen is immersed in water for twenty-four hours at 70° F. This delamination usually occurs on the initial run of a cork composition mat for gasket manufacture having a density in the order of 17 pounds per cubic foot, following the production of cork tile mats of a density in the order of 28–29 pounds per cubic foot.

An object of the present invention, therefore, is to provide a mold for dielectric heating including a liner of dielectric material so constructed as to overcome the problem of liner delamination and blistering.

Another object of the invention is to provide a mold for dielectric heating including a mold liner of dielectric material so constructed as to permit cycling with products to be heated having essentially different moisture contents and different degrees of compression without deleterious action on the mold liner.

Other objects of the invention will be apparent from the following detailed description of an embodiment of the invention.

Figure 2:
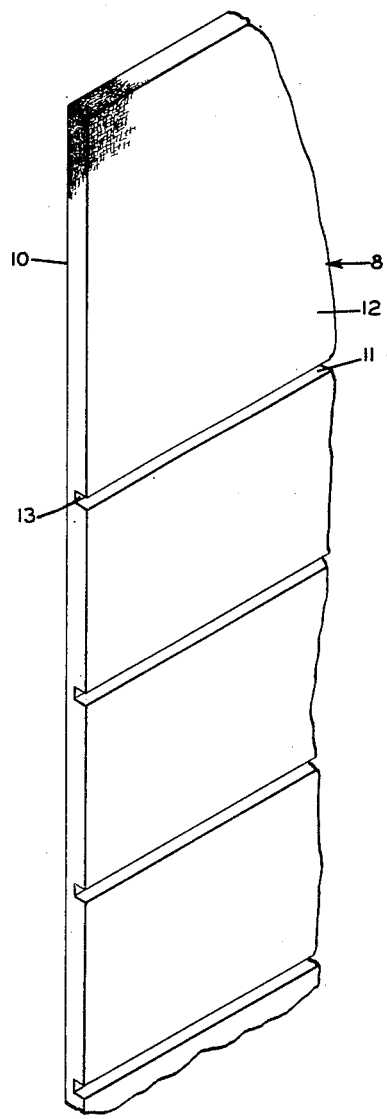

In the drawing,

Figure 1 is a diagrammatic view, partly in section, illustrating the mold connected to a source of high-frequency alternating voltage; and Figure 2 is a perspective view of a portion of a mold liner as shown in Figure 1, but to an enlarged scale.

According to the present invention a mold is provided for confining a charge of a dielectric material during processing by dielectric heating in which the charge of material and the mold are both dielectrically heated simultaneously. The mold side walls are formed of a backing of dielectric material and a liner of dielectric material which is only minutely pervious to the passage of moisture. The liner has a forming surface for engagement with the charge of material to be dielectrically heated in the mold and is provided with a plurality of artificially formed openings therein extending from the surface thereof opposite to the forming surface and penetrating throughout a major portion of the thickness of the body of the liner but terminating short of the forming surface. These openings provide passageways for the escape of gas and vapor from within the minutely pervious body of the liner during dielectric heating thereof and avoid the development of disruptive force of expansion within the body of the liner.

Referring to the drawings, the mold is of the general type shown in Lockwood Patent 2,625,710 and my Patent 2,663,790. It includes side walls 2, 3, 4, and 5 which are preferably made of panels of wood, such as maple wood, impregnated with a moisture-resistant substance such as ceresin wax. End plates 6 and 7 which constitute electrodes and form the top and bottom walls of the mold are provided, and these are coupled to a high-frequency source as diagrammatically illustrated in Figure 1.

Mounted in good face-to-face contact with each of the side walls of the mold on the inner surface thereof are laminated liners 8 formed of silicone resin impregnated glass fabric or other liner material possessing a dielectric loss factor of at least .0002 at 10 megacycles and 70° F. and the other requisite characteristics recited above and more fully disclosed in my parent application Serial No. 338,107. The liner may be about 1/8" thick and may have a dielectric loss factor at 10 megacycles and 70° F. of .0058. It is drilled and countersunk and wooden screws 9 pass through drilled openings and are received within tapped openings provided in the mold walls. Preferably the screws are made of maple wood and impregnated with ceresin wax. Thus they have the same dielectric properties as the mold walls, including a loss factor at 10 megacycles and 70° F. between .1 and .4. The liners are preferably cut so that a single sheet covers each of the four side wall sections.

A portion of one of the liners 8 is shown in Figure 2 to an enlarged scale. It has a forming surface 10 which is smooth to the touch and hard, but is nevertheless minutely pervious to the passage of moisture. As noted above with laminated glass filament fabric impregnated with silicone resin, this moisture perviousness may be almost infinitesimal, i. e., .35% when a 1" x 3" specimen is immersed in water at 70° F. for twenty-four hours. This perviousness, however, may result in delamination of the liner as noted above. This is avoided in accordance with this invention by the provision of artificial openings 11 which extend from the surface 12 of the liner 8 opposite to the forming surface 10 and penetrate throughout a major portion of the thickness of the body of the liner but terminate short of the forming surface 10. In the embodiment illustrated the openings are in the form of grooves which extend horizontally throughout the length of the panels. In a mold to form a mat about 9" thick, the grooves may be about 1/16" wide, spaced on centers of about 1 1/4" with the top and bottom grooves disposed about 1 1/2" from the edges of the liner. With a liner 1/8" thick the grooves may be about .075" deep, the distance from the forming surface 10 to the bottom 13 of the grooves being about .050".

Instead of providing grooves as shown, other artificial openings may be provided. It is preferred, however, to use horizontally disposed grooves for they provide good channels for the escape of gas and vapor and may be very easily formed in the liner by the use of milling cutters or the like.

The depth and spacing of the artificial openings will vary, depending upon the thickness of the liner, its moisture absorption characteristics, the strength of the bonding material which holds the lamina together, the moisture conditions encountered in use, and other factors. Generally, there will be no disadvantage in providing more artificial openings than are necessary to permit adequate venting to avoid delamination, blistering, or other damage to the liner, consistent, of course, with the maintenance of adequate strength in the liner. The openings should extend from the surface 12 which lies contiguous to the backing layer—the wood panel 2 in Figure 1—to a zone close to the forming surface 10, for the moisture encountered in service will be forced into the liner from the composition which is disposed within the mold and in engagement with the liner.

For best results, the thickness of the liner should not be more than about one-fourth of the total thickness of the mold wall, as noted in my parent application.

I claim:

1. In a mold for confining a charge of dielectric material during processing by dielectric heating in which the charge of material and the mold are both dielectrically heated simultaneously, the combination of a mold side wall formed of a backing of dielectric material and a liner of dielectric material which is only minutely pervious to the passage of moisture, said liner having a smooth and substantially impervious forming surface for engagement with the charge of material to be dielectrically heated in the mold and having a plurality of artificially-formed openings in the liner extending from the surface thereof opposite to the forming surface and penetrating throughout a major portion of the thickness of the body of the liner and terminating short of said forming surface, said openings providing passageways for the escape of gas and vapor from within the minutely pervious body of said liner during dielectric heating thereof to avoid the development of disruptive forces of expansion within the body of said liner.

2. In a mold for confining a charge of dielectric material during processing by dielectric heating in which the charge of material and the mold are both dielectrically heated simultaneously, the combination of claim 1 in which the backing has a dielectric loss factor between .1 and .4 and the liner has a lower dielectric loss factor.

3. In a mold for confining a charge of dielectric material during processing by dielectric heating in which the charge of material and the mold are both dielectrically heated simultaneously, the combination of claim 2 in which the backing is of hard wood impregnated with a waterproofing impregnant and in which the liner has a dielectric loss factor more than .0002 and less than that of the backing.

4. In a mold for confining a charge of dielectric material during processing by dielectric heating in which the charge of material and the mold are both dielectrically heated simultaneously, the combination of claim 1 in which the artificially formed openings are in the form of horizontally disposed grooves which extend from edge to edge of the liner.

References Cited in the file of this patent

UNITED STATES PATENTS

| | | |
|---|---|---|
| 2,441,548 | Sperry | May 11, 1948 |
| 2,514,484 | Frederick, Jr. | July 11, 1950 |
| 2,581,939 | Deist et al. | Jan. 8, 1952 |